(12) United States Patent
Tachikawa

(10) Patent No.: US 8,526,023 B2
(45) Date of Patent: Sep. 3, 2013

(54) IMAGE PROCESSING APPARATUS AND CONTROL METHOD IMAGE PROCESSING APPARATUS AND CONTROL METHOD FOR SYNCHRONIZING AN IMAGE DATA SIGNAL WITH A DISCRETE EFFECTIVE PIXEL SIGNAL AND CONTINUOUS EFFECTIVE PIXEL SIGNAL

(75) Inventor: Tomohiro Tachikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/141,748

(22) PCT Filed: Jul. 23, 2010

(86) PCT No.: PCT/JP2010/062966
§ 371 (c)(1),
(2), (4) Date: Jun. 23, 2011

(87) PCT Pub. No.: WO2011/036945
PCT Pub. Date: Mar. 31, 2011

(65) Prior Publication Data
US 2011/0261384 A1    Oct. 27, 2011

(30) Foreign Application Priority Data
Sep. 24, 2009   (JP) .................. 2009-219762

(51) Int. Cl.
G06F 3/12    (2006.01)
H04N 1/40    (2006.01)

(52) U.S. Cl.
USPC .......................................... 358/1.13; 358/1.1

(58) Field of Classification Search
USPC ................ 358/1.1, 1.2, 1.9, 1.12, 1.13, 1.14, 358/1.15; 710/29, 52, 61; 345/530, 534, 345/545, 558
See application file for complete search history.

(56) References Cited

U.S. PATENT DOCUMENTS 4,845,358 A * 7/1989 Asada ........................... 250/235
6,452,690 B1 * 9/2002 Nakagawa .................... 358/1.15

(Continued)

FOREIGN PATENT DOCUMENTS

JP    2003-087639 A    3/2003
JP    2009-075973 A    4/2009

OTHER PUBLICATIONS

Japan Patent Office, International Search Report for International Application No. PCT/JP2010/062966, mailed Sep. 21, 2010, 2 pages.

(Continued)

*Primary Examiner* — Gabriel Garcia
(74) *Attorney, Agent, or Firm* — Fitzpatrick, Cella, Harper & Scinto

(57) ABSTRACT

In an image processing apparatus having a first image processing unit for operating at a first clock signal and a second image processing unit for operating at a second clock signal having a second frequency which is higher than the first frequency, if image data is supplied from the first image processing unit to the second image processing unit, the second clock signal is supplied to the second image processing unit when intra-line image data of the image data is being transmitted and pixel data to be processed in the image data exists. If the intra-line image data is being transmitted and no pixel data to be processed in the image data exists, no clock signal is supplied to the second image processing unit.

5 Claims, 14 Drawing Sheets

(56) References Cited

U.S. PATENT DOCUMENTS

| | | | |
|---|---|---|---|
| 7,128,270 B2 * | 10/2006 | Silverbrook et al. | 235/472.01 |
| 7,233,410 B2 * | 6/2007 | Sekiguchi et al. | 358/1.16 |
| 8,111,420 B2 * | 2/2012 | Sekiguchi et al. | 358/1.16 |
| 2007/0211290 A1 * | 9/2007 | Sekiguchi et al. | 358/1.16 |

OTHER PUBLICATIONS

Japan Patent Office, Written Opinion of the International Searching Authority for International Application No. PCT/JP2010/062966, mailed Sep. 21, 2010, 3 pages.

* cited by examiner

US 8,526,023 B2

IMAGE PROCESSING APPARATUS AND CONTROL METHOD IMAGE PROCESSING APPARATUS AND CONTROL METHOD FOR SYNCHRONIZING AN IMAGE DATA SIGNAL WITH A DISCRETE EFFECTIVE PIXEL SIGNAL AND CONTINUOUS EFFECTIVE PIXEL SIGNAL

CROSS REFERENCE TO RELATED APPLICATIONS

The present application is a U.S. National Stage Entry of International Application No. PCT/JP2010/062966, filed Jul. 23, 2010, which claims priority to Japan Patent Application No. 2009-219762, filed Sep. 24, 2009. The entire disclosure of each prior application is incorporated herein by reference.

TECHNICAL FIELD

The present invention relates to interface technology in which image data is exchanged by synchronizing an image data signal with a discrete effective pixel signal and a continuous effective pixel signal.

BACKGROUND ART

There is an interface that sends and receives image data using a synchronizing clock, an effective pixel signal indicating the timing of effective pixels in image data, and image data. An example is described below in which image processing apparatuses having such interfaces are connected to each other. For instance, in a case where a first image processing apparatus that outputs an effective pixel signal for each line at discrete timings is connected to a second image processing apparatus that requires a continuous effective pixel signal for each line and recognizes as a line interval when the effective pixel signal is not asserted and image data is transmitted from the first image processing apparatus to the second image processing apparatus, a line buffer for storing a single line of image data needs to be provided therebetween. Specifically, the line buffer stores a single line of image data that is output from the first image processing apparatus in accordance with a discrete effective pixel signal. The stored single line of image data is then supplied together with a continuous effective pixel signal to the second image processing apparatus. Such a conventional method using a line buffer requires a line buffer for storing a single line of image data and thus faces the challenge of increased cost.

Meanwhile, Japanese Patent Laid-Open No. 2003-087639 has proposed a technique in which, when image processing apparatuses are connected, a signal that is obtained by taking a logical OR of a delayed effective pixel signal and an original effective pixel signal is used as a clock gate, thereby reducing power consumption during time periods when image data is not effective.

Following is a description of the challenges to be faced when the technique disclosed in Japanese Patent Laid-Open No. 2003-087639 is used in order to connect the aforementioned first and second image processing apparatuses.

FIG. 1 is a diagram illustrating an example where the method described in Japanese Patent Laid-Open No. 2003-087639 is applied to a case where four clocks (four cycles) are necessary for subsequent image processing in the first image processing apparatus that outputs a discrete effective pixel signal.

A clock signal 100 is always output as a synchronizing clock. Reference numeral 101 denotes an effective pixel signal that is high-level at the timings of effective pixels in image data. Reference numeral 102 denotes a delayed effective pixel signal that is obtained by delaying the effective pixel signal 101 by four clock cycles, which is necessary for image processing. A gate signal 103 is generated by taking a logical OR of the effective pixel signal 101 and the delayed effective pixel signal 102. Reference numeral 104 denotes a clock signal that is obtained by gating the clock signal 100 with the gate signal 103. Reference numeral 105 denotes image data that is indicated as being effective by the gated clock signal 104. The subsequent image processing apparatus uses the gated clock signal 104 as a clock to process parts of the image data 105 where the effective pixel signal 101 is effective.

The subsequent image processing apparatus can obtain effective image data 105 at a leading edge 110 of the gated clock signal 104 obtained as described above in Japanese Patent Laid-Open No. 2003-087639, where the effective pixel signal 101 is effective. However, image data that is not effective is input at a leading edge 111 because the effective pixel signal 101 is not effective. In addition, although four clock cycles are needed at the back end of each line, the gated clock signal 104 has less than four cycles at the back end of line. That is, there is no fourth clock that is needed at a fourth cycle time at the timing 112. This shows the problems that an extra clock edge is generated at the leading edge 111 and no clock is generated at the timing 112. In other words, the challenge faced is that the method disclosed in Japanese Patent Laid-Open No. 2003-087639 cannot be applied as-is to cases where an image processing apparatus that outputs the discrete effective pixel signal is connected to an image processing apparatus that requires the continuous effective pixel signal.

SUMMARY OF INVENTION

An aspect of the present invention is to eliminate the above-mentioned problems with the conventional technology.

A feature of the present invention is to provide an image processing apparatus that uses a clock signal and an effective pixel signal to enable the supply of a discrete effective pixel signal to an image processing unit that requires a continuous effective pixel signal, as well as eliminating the need for a line buffer for one line that has conventionally been required, and to provide a control method therein.

According to an aspect of the present invention, there is provided an image processing apparatus including first image processing means for operating at a first clock signal having a first frequency and second image processing means for operating at a second clock signal having a second frequency which is higher than the first frequency, the apparatus comprising: control means for, in a case that image data is supplied from the first image processing means to the second image processing means, performing control so that the second clock signal is supplied to the second image processing means if intra-line image data of the image data is being transmitted and pixel data to be processed in the image data exists, no clock signal is supplied to the second image processing means if the intra-line image data of the image data is being transmitted and no pixel data to be processed in the image data exists, and the second clock signal is supplied to the second image processing means if the intra-line image data of the image data is not being transmitted, irrespective of whether or not the pixel data to be processes in the image data exists.

According to another aspect of the present invention, there is provided a method for controlling an image processing apparatus including a first image processing unit that operates at a first clock signal having a first frequency and a second image processing unit that operates at a second clock signal having a second frequency which is higher than the first frequency, the method comprising: a control step of, when image data is input from the first image processing unit to the second image processing unit, performing control so that the second clock signal is supplied to the second image processing unit if intra-line image data of the image data is being transmitted and where pixel data to be processed in the image data exists, no clock signal is supplied to the second image processing unit if the intra-line image data of the image data is being transmitted and no pixel data to be processed in the image data exists, and the second clock signal is supplied to the second image processing unit if the intra-line image data of the image data is not being transmitted, irrespective of whether or not pixel data to be processed in the image data exists.

Further features and aspects of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
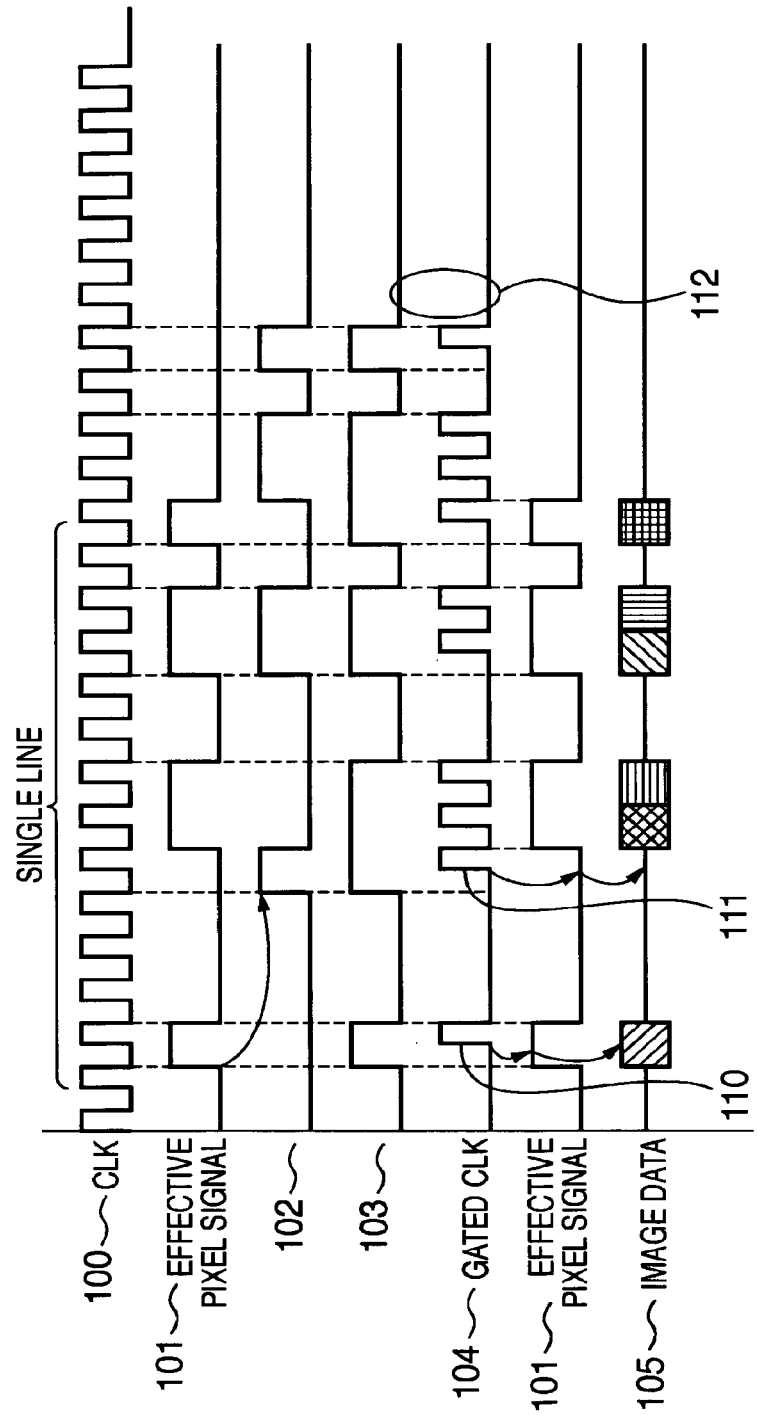
FIG. 1 is a timing chart illustrating the challenge to be faced when a conventional technique is applied.
Figure 2:
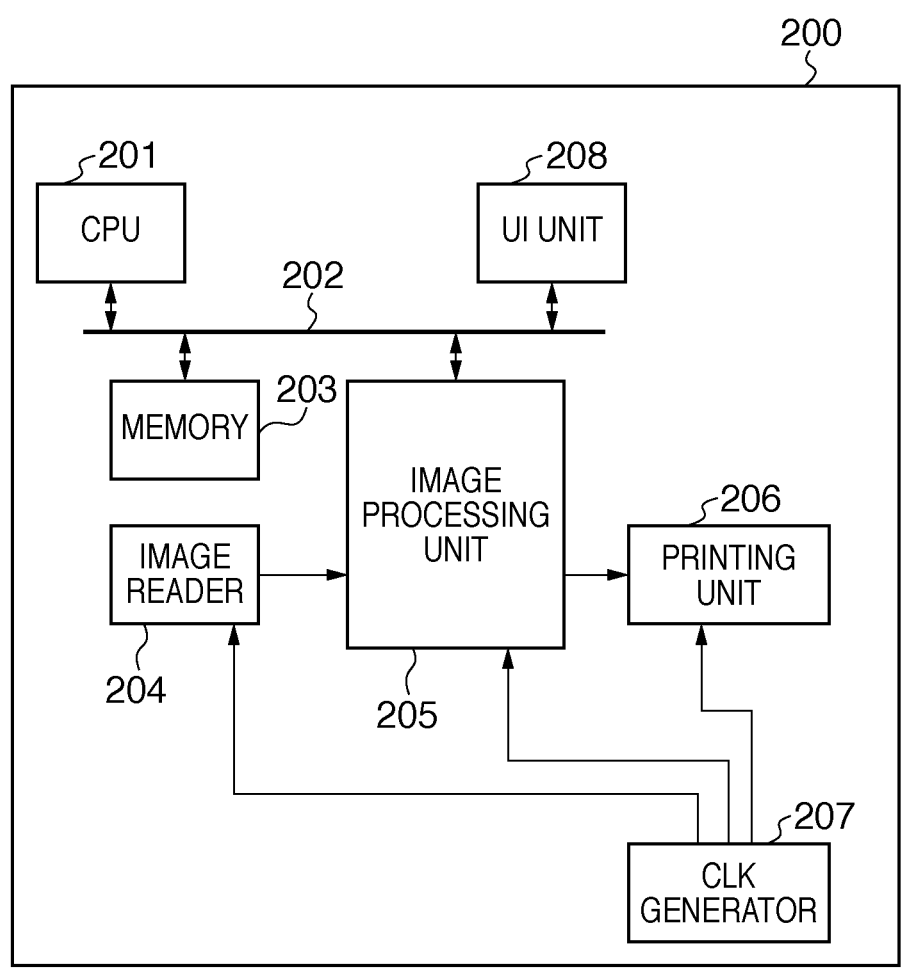
FIG. 2 is a block diagram describing a configuration of a copying machine according to an embodiment of the present invention.

FIG. 2 is a block diagram describing a configuration of a copying machine 200 according to an embodiment of the present invention.

A CPU 201 controls the operation of the entire copying machine 200 in accordance with a program stored in a memory (RAM) 203. A user interface (UI) unit 208, in accordance with a user operation, notifies the CPU 201 of the contents indicated by the user operation. Also, the UI unit 208 includes a display unit that displays messages, warnings, and the like to the user. An image reader 204 is a scanner, for example, that reads an original in paper form to obtain image data indicating an image of the original. An image processing unit 205 performs image processing on the image data obtained by the image reader 204. A printing unit 206 includes a printer engine and prints on a paper medium an image based on the image data that has undergone the image processing performed by the image processing unit 205. A clock (CLK) generator 207 generates a clock (CLK) signal and supplies the clock signal to the image reader 204, the image processing unit 205, and the printing unit 206. A system bus 202 provides connections among the CPU 201, the UI unit 208, the memory 203, and the image processing unit 205. Note that programs executed by the CPU 201 are loaded at the time of execution from an HDD (not shown), in which the programs are installed, into the memory 203 and then executed under control of the CPU 201.

Figure 3:
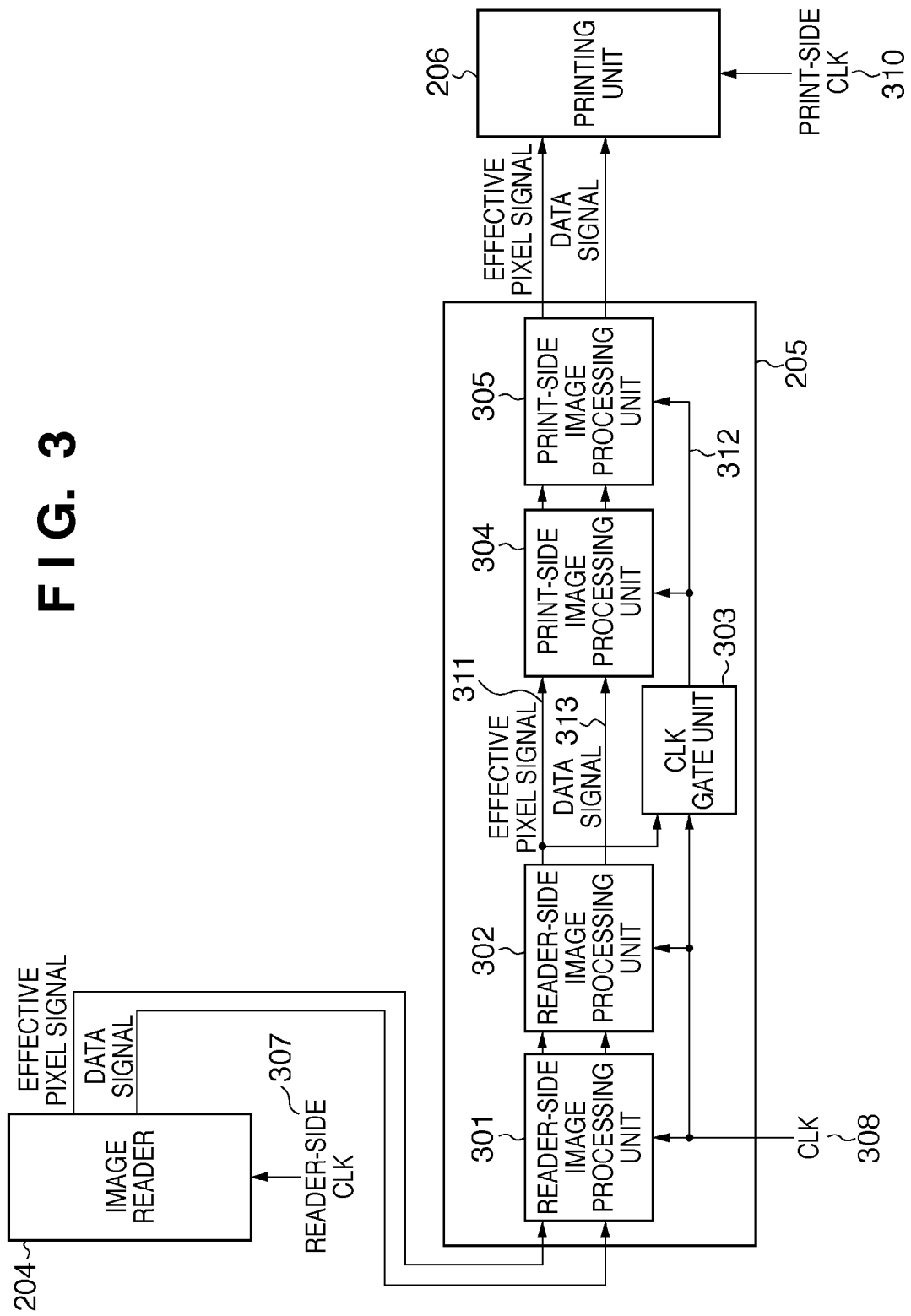
FIG. 3 is a block diagram describing a configuration of an image processing unit according to the embodiment of the present invention.

FIG. 3 is a block diagram describing a configuration of the image processing unit 205 according to the present embodiment, and common parts to those described above in FIG. 2 are denoted by the same reference numerals.

Reference numerals 307, 308, and 310 denote clock signals that are supplied from the clock generator 207 respectively to the image reader 204, the image processing unit 205, and the printing unit 206. The image processing unit 205 includes reader-side image processing units (first image processing unit) 301 and 302, print-side image processing units (second image processing unit) 304 and 305, and a CLK gate unit 303. An image data signal 313 is image data that is output from the reader-side image processing unit 302, and an effective pixel signal 311 is output from the reader-side image processing unit 302. A gate clock signal 312 is a clock signal for operating the print-side image processing units 304 and 305. The CLK gate unit 303 outputs the gate clock signal 312 that is obtained by gating the clock signal 308 with the effective pixel signal 311.

Figure 4:
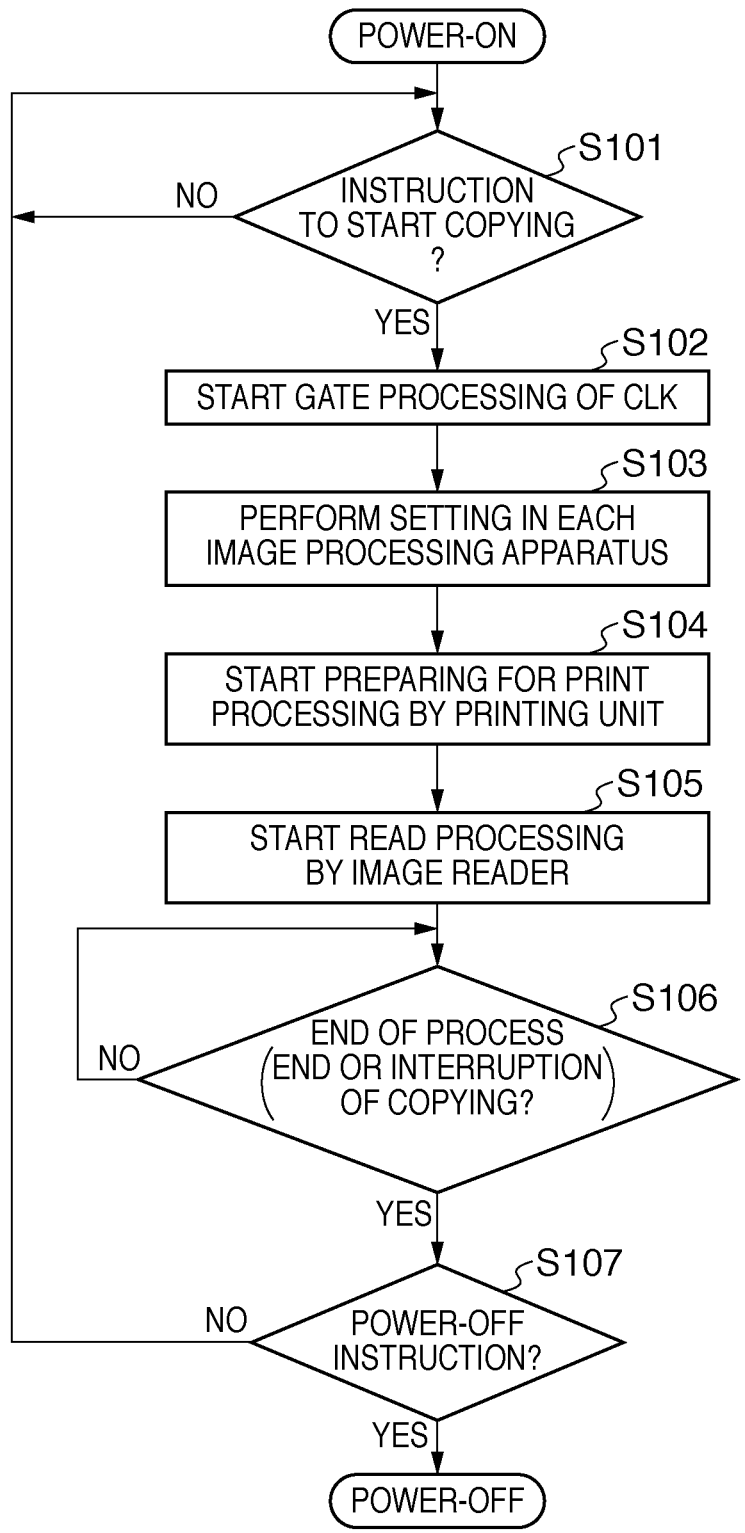
FIG. 4 is a flowchart describing a copy operation performed by the copying machine according to the embodiment of the present invention.

FIG. 4 is a flowchart describing copy processing performed by the copying machine according to the present embodiment.

First, in step S101, the CPU 201 waits for the user to input an instruction to start copy processing by pressing a copy button on the UI unit 208. Upon receipt of an instruction to start copying, the process proceeds to step S102 where the CLK gate unit 303 of the image processing unit 205 starts gate processing of the clock signal 308. In step S103, the contents of image processing are set to the reader-side image processing units 301 and 302 and the print-side image processing units 304 and 305. Next, the process proceeds to step S104 where the printing unit 206 starts preparing for print processing to enable the execution of print processing when image data is input. The process then proceeds to step S105 where the image reader 204 starts a process for reading an original, and the read image data is input into the printing unit 206 through the image processing unit 205. The process then proceeds to step S106 and waits for either the completion of the print processing performed by the printing unit 206 or the user to input an instruction to end the process by pressing a print cancel button on the UI unit 208. If it is determined in step S106 that the process is to end, the process proceeds to step S107 where it is determined whether or not the user has issued a power-off instruction by pressing a power-off button on the UI unit 208, and if there is no power-off instruction, the process returns to step S101 and repeats the aforementioned processing.

Following is a description of the connection between an image processing unit that outputs a discrete effective pixel signal and an image processing unit that inputs a continuous effective pixel signal, which is a feature of the present embodiment. The effective pixel signal indicates a timing of which pixel data to be processed exists in image data, or the pixel data to be processed in the image data.

Figure 5:
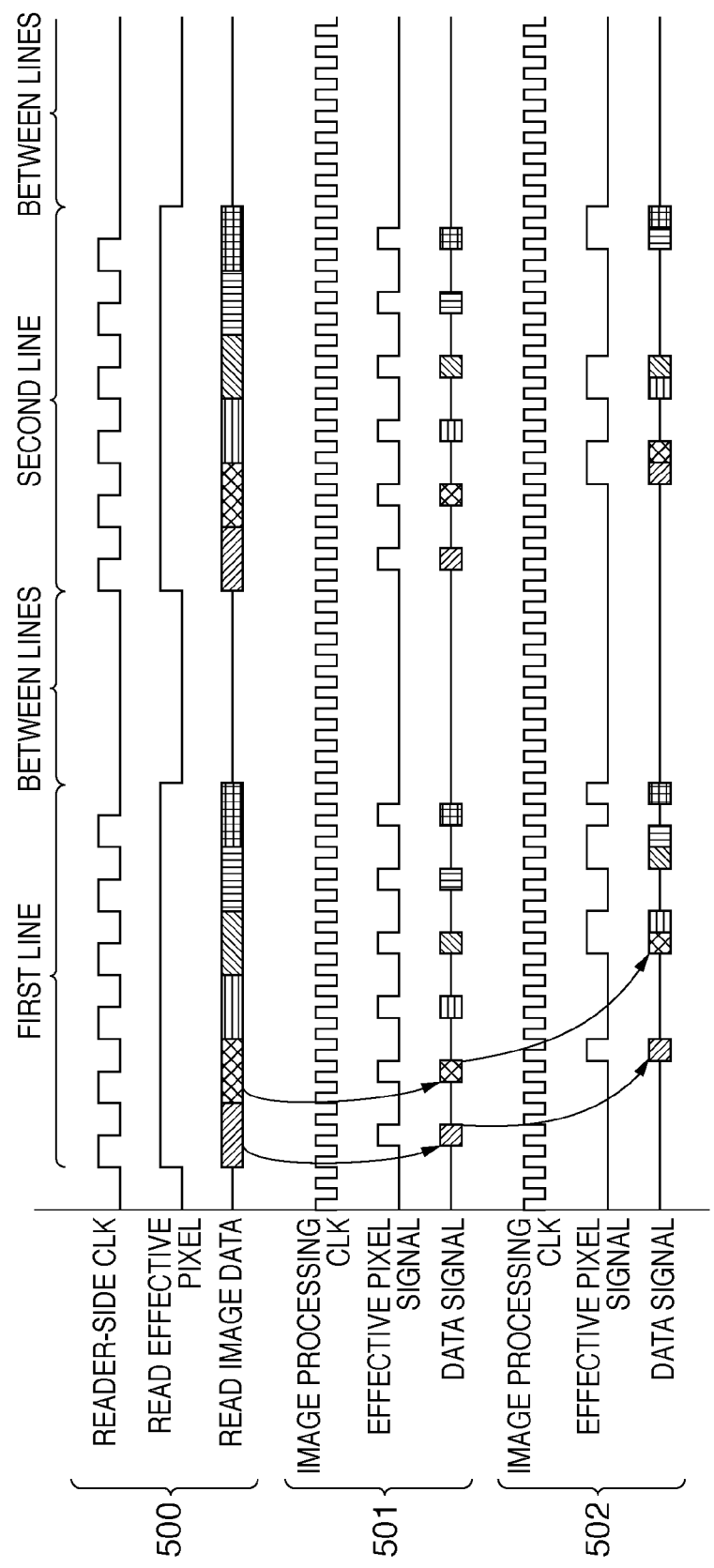
FIG. 5 is a diagram describing output signal waveforms of an image reader and reader-side image processing units.

FIG. 5 is a diagram describing output signal waveforms of the image reader 204 and the reader-side image processing units 301 and 302 according to the present embodiment.

Reference numeral 500 denotes the waveforms of the signals output from the image reader 204, reference numeral 501 denotes the waveforms of the signals output from the reader-side image processing unit 301, and reference numeral 502 denotes the waveforms of the signals output from the reader-side image processing unit 302.

The image reader 204 detects the density of an image of an original, and the printing unit 206 prints the image using a pattern according to the density. Accordingly, the frequency of the clock signal 307 supplied to the image reader 204 is lower than that of the clock signal 310 supplied to the printing unit 206. In addition, since the image processing unit 205 outputs image data to the printing unit 206, the frequency of the clock signal 308 supplied to the image processing unit 205 is the same as that of the clock signal 310 supplied to the printing unit 206. Therefore, in the reader-side image processing unit 301, an image signal that has been output in synchronization with the low-frequency clock signal 307 is input in synchronization with the higher-frequency clock signal 308. To do this, the output signal from the image reader 204 is sampled at specified periods of a higher-frequency clock signal and output at timings indicated by 501. Because of this frequency difference, the effective pixel signal output from the reader-side image processing unit 301 takes an effective value at discrete timings. Also, the effective pixel signal can be a continuous signal or a discrete signal depending on the contents of image processing, as shown by the output signal waveforms of the reader-side image processing unit 302 as indicated by 502. That is, it can be said that the reader-side image processing units 301 and 302 are image processing units that output a discrete effective pixel signal.

Figure 6:
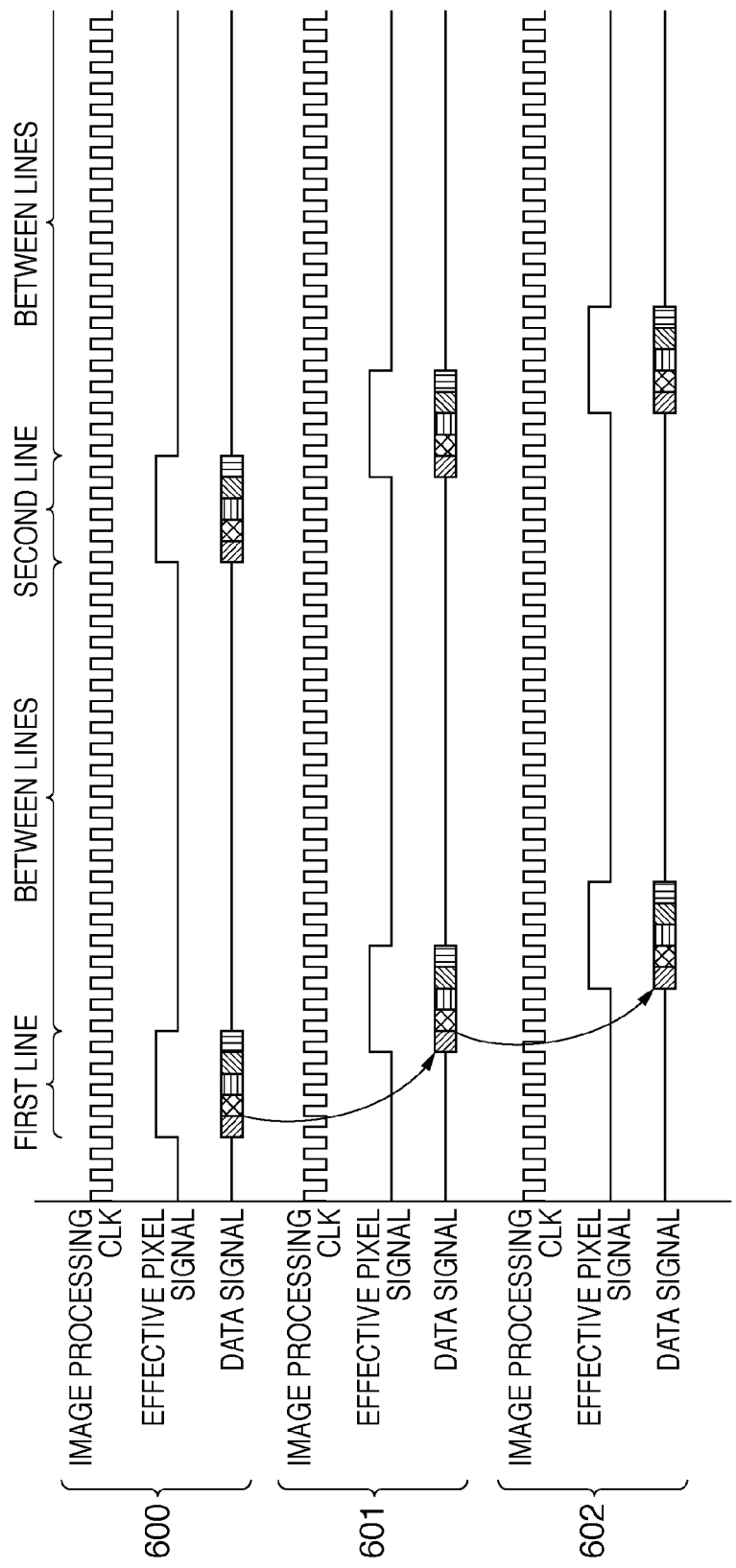
FIG. 6 is a diagram describing input interface waveforms of print-side image processing units and a printing unit.

FIG. 6 is a diagram describing the input interface waveforms of the print-side image processing units 304 and 305 and the printing unit 206.

Reference numeral 600 denotes the waveforms of the signals input into the print-side image processing unit 304, reference numeral 601 denotes the waveforms of the signals input into the print-side image processing unit 305, and reference numeral 602 denotes the waveforms of the signals input into the printing unit 206. The printing unit 206 needs to continuously input image data on a line-by-line basis and thus needs to input image data having a continuous waveform on a line-by-line basis as indicated by 602. In other words, the input of a continuous effective pixel signal is required. In order to input the continuous effective pixel signal into the printing unit 206, the inputs into the print-side image processing units 304 and 305 also need to be a continuous effective pixel signal as indicated by 600 and 601. That is, a discrete effective pixel signal output from the reader-side image processing unit 302 must be supplied to the print-side image processing unit 304 with the continuous effective pixel signal.

It is normally impossible to directly input the discrete effective pixel signal from the reader-side image processing unit 302, as indicated by 502 in FIG. 5, into the print-side image processing unit 304 that expects the input of the continuous effective pixel signal as indicated by 600. Therefore, the CLK gate unit 303 is used to generate the gate clock signal 312 while the discrete effective pixel signal 311 is being asserted. Then, this gate clock signal 312 is supplied to the print-side image processing unit 304 and used as an operation clock of the image processing unit 304. While the effective pixel signal 311 is not asserted, the gate clock signal 312 is not supplied to the print-side image processing unit 304 so that the operation of the print-side image processing unit 304 is stopped. Thereby the effective pixel signal 311 seems continuous on the side of the print-side image processing unit 304. In this way, the effective pixel signal 311 and the image data signal 313 are directly input from the reader-side image processing unit 302 into the print-side image processing unit 304. As described above, the CLK gate unit 303 according to the present embodiment is necessary in order to connect the reader-side image processing unit 302 that outputs the discrete effective pixel signal and the print-side image processing unit 304 that receives an input of the continuous effective pixel signal. Following is a description of the CLK gate unit 303 that generates the operation clock of the print-side image processing units 304 and 305.

First Embodiment

The CLK gate unit 303 according to the first embodiment of the present invention is described below.

Figure 7:
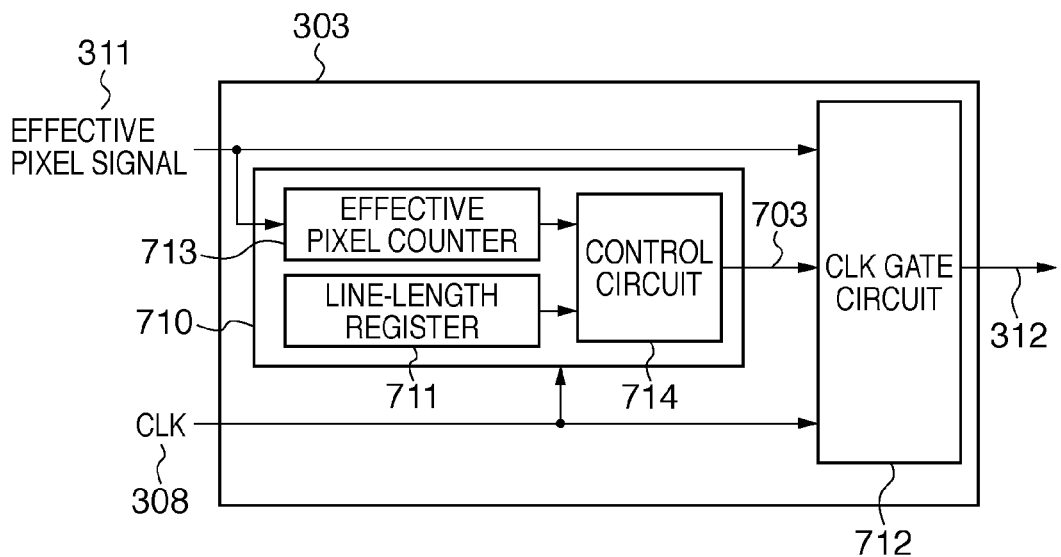
FIG. 7 is a block diagram describing a configuration of a clock gate unit according to a first embodiment.

FIG. 7 is a block diagram describing a configuration of the CLK gate unit 303 according to the first embodiment, and common parts to those in the aforementioned drawings are denoted by the same reference numerals.

An intra-line signal generation circuit 710 includes an effective pixel counter 713 that counts the number of effective pixels during the effective pixel signal 311 being asserted, a line-length register 711 in which the number of effective pixels per line has been set in advance, and a control circuit 714. The control circuit 714 compares the count value of the effective pixel counter 713 with the number of effective pixels per line that has been set in the line-length register 711, and if it is determined that the count value is less than or equal to the number of effective pixels per line, outputs an intra-line signal 703. The intra-line signal 703 is a signal indicating the timing of transmission of intra-line image data by being high-level when the count value is less than or equal to the number of effective pixels per line. A clock (CLK) gate circuit 712 generates the gate clock signal 312 by gating the clock signal 308 with the effective pixel signal 311 and the intra-line signal 703.

Figure 8:
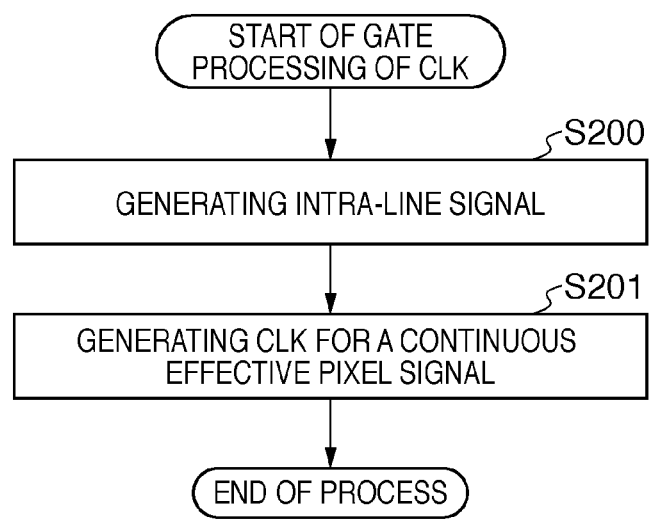
FIG. 8 is a flowchart describing processing performed by the clock gate unit according to the first embodiment.

FIG. 8 is a flowchart describing a process for controlling the interface of the CLK gate unit 303 according to the present embodiment.

First, the process for generating the intra-line signal 703 starts in step S200. The processing of step S200 will be described later in detail with reference to the flowchart of FIG. 9. Next, the process proceeds to step S201 where the process for generating the gate clock signal 312 for the continuous effective pixel signal is started. The processing of step S201 will be described later with reference to the flowchart of FIG. 10.

Figure 9:
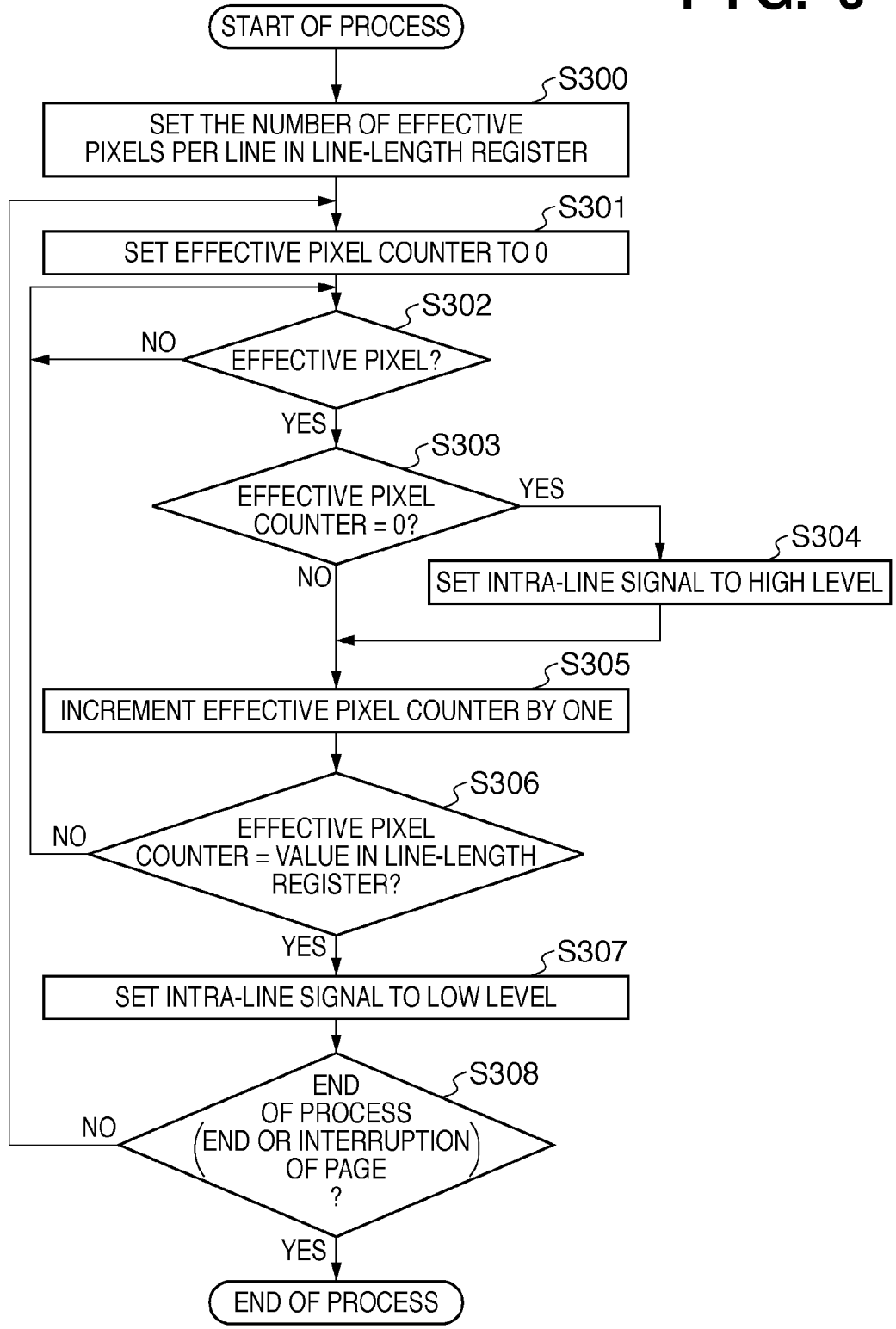
FIG. 9 is a flowchart describing a process for generating an intra-line signal, performed by an intra-line signal generation circuit.

FIG. 9 is a flowchart describing the process for generating the intra-line signal 703, performed by the intra-line signal generation circuit 710.

First, the number of effective pixels per line is set in the line-length register 711 in step S300. Next, the process proceeds to step S301 where the effective pixel counter 713 is initialized to "0". Then, the process proceeds to step S302 where it is determined whether or not an effective pixel has been input. Whether an effective pixel has been input or not is determined by whether or not the effective pixel signal 311 is effective (high-level). If the effective pixel signal 311 is not effective, that is, the effective pixel is not high-level, the processing of step S302 is repeated, and when the effective pixel signal 311 becomes high-level, the process proceeds to step S303. In step S303, it is determined whether or not the count value of the effective pixel counter 713 is "0". If the count value of the effective pixel counter 713 is "0", the process proceeds to step S304 where the intra-line signal 703 is set to high-level because the pixel is the first effective pixel in the line, and the process proceeds to step S305. On the other hand, if the count value of the effective pixel counter 713 is not "0" in S303, the process proceeds to step S305 because the intra-line signal 703 is already high-level. In step S305, the effective pixel counter 713 is incremented by one. The process then proceeds to step S306 where it is determined whether or not the count value of the effective pixel counter 713 has reached the value of the line-length register 711 (the number of effective pixels per line) that has been set in step S300, that is, whether or not the count value has reached the number of effective pixels per line. If it is determined NO in step S306, the process proceeds to step S302, and if the count value has reached the number of effective pixels per line, the process proceeds to step S307. In step S307, the intra-line signal 703 is set to low-level because the processing of a single line of pixel signals has been completed. Then, the process proceeds to step S308 where it is determined whether or not a next line exists, that is, whether or not a single page of image processing has been completed, and if the processing has not yet been completed, the process proceeds to step S301. On the other hand, if it is determined that the processing has been completed, the process ends.

The processing described above enables the generation of the intra-line signal 703 that becomes high-level during the line of image data and low-level between lines of image data.

Figure 10:
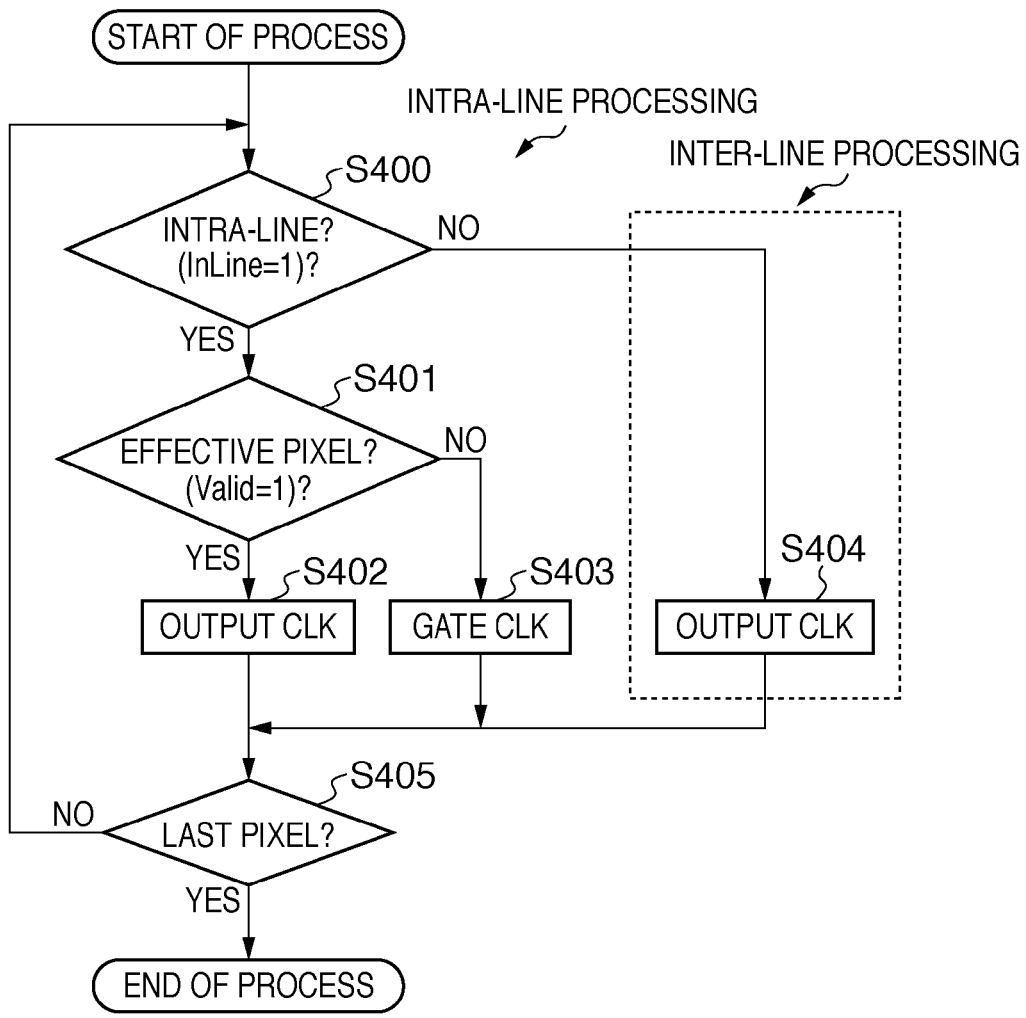
FIG. 10 is a flowchart describing a process for generating a clock for a continuous effective pixel signal.

FIG. 10 is a flowchart describing the processing of 5201 in FIG. 8 for generating a clock for a continuous effective pixel signal.

First, it is determined in step S400 whether or not the intra-line signal 703 is high-level, that is, whether or not intra-line image data is being transmitted. If intra-line image data is being transmitted, the process proceeds to step S401, and if not, the process proceeds to step S404 where a clock pulse of the clock signal 308 is output as-is. In step S401, it is determined whether or not the pixel is an effective pixel, based on the effective pixel signal 311. Here, if the pixel is determined as being an effective pixel, the process proceeds to step S402 where a clock pulse of the clock signal 308 is output as the gate clock signal 312 without being gated. On the other hand, if the pixel is determined as not being an effective pixel in step S401, the process proceeds to step S403 where the gate clock signal 312 is not output. After execution of the processing of step S402, S403, or S404, the process proceeds to step S405 where it is determined whether or not the pixel is the last pixel in the line, and if it is not the last pixel in the line, the process repeats the processing from step S400. If the pixel is determined as being the last pixel in step S405, the process ends.

Figure 11:
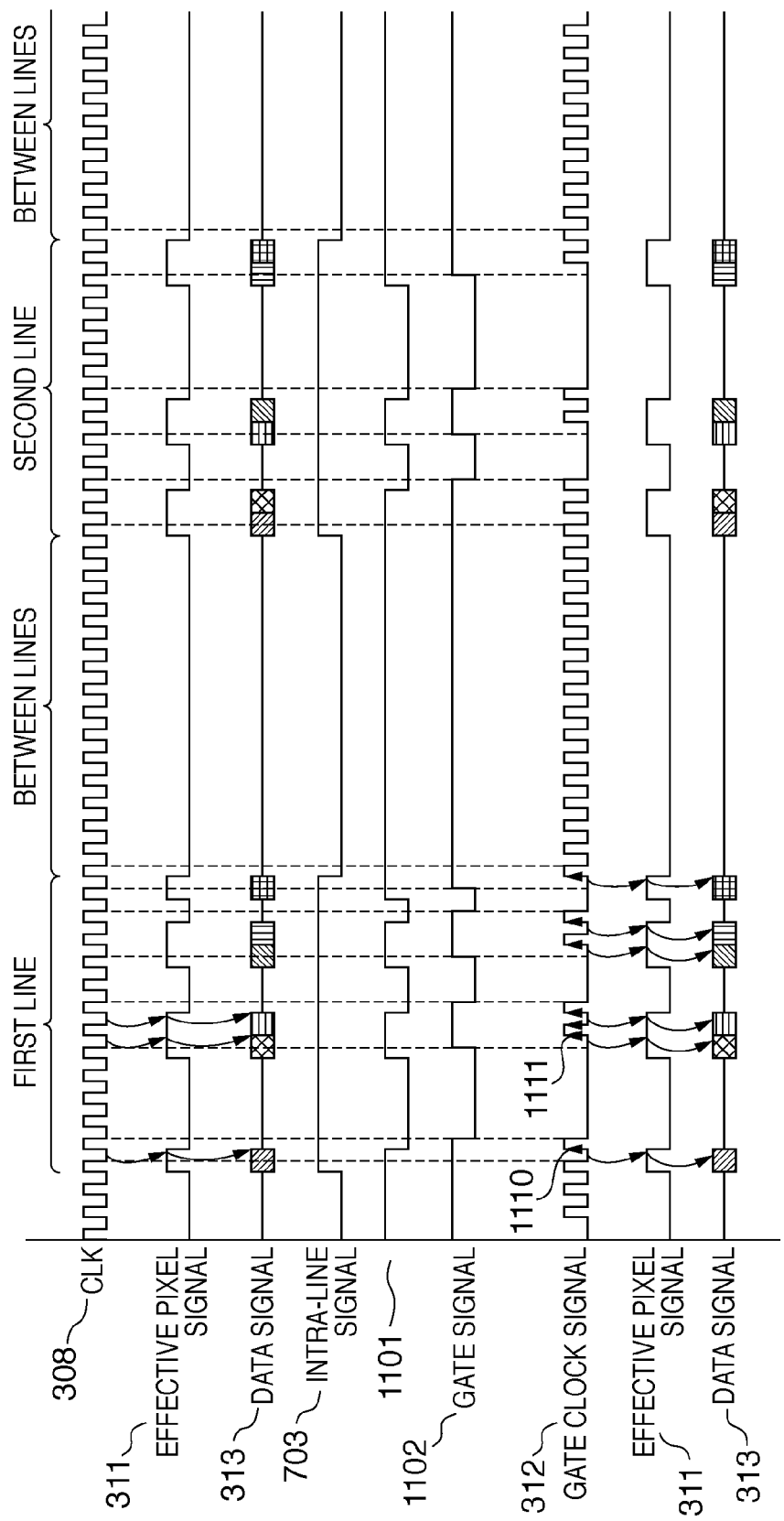
FIG. 11 is a timing chart describing the generation of a gate clock signal according to the first embodiment.

Following is a description of the method for generating the gate clock signal 312 according to the first embodiment, with reference to the timing chart of FIG. 11. In FIG. 11, common parts to those in the aforementioned drawings are denoted by the same reference numerals and a description thereof has been omitted.

The clock signal 308 is a clock signal of the reader-side image processing unit 302 that outputs a discrete effective pixel signal. The effective pixel signal 311 is output from the reader-side image processing unit 302. The intra-line signal 703 is output from the intra-line signal generation circuit 710. A signal 1101 is obtained by taking a logical OR of a signal obtained by inverting the logic of the intra-line signal 703 and the effective pixel signal 311. The signal 1101 thus obtained is used as an input signal, and a signal that holds the state of the signal 1101 at every trailing edge of the clock signal 308 is a gate signal 1102. Taking a logical AND of the gate signal 1102 and the clock signal 308 obtains the gate clock signal 312.

In a case where the gate clock signal 312 thus obtained is used as an operation clock and the effective pixel signal 311 and the image data signal 313 are input into the print-side image processing unit 304, initial image data is received at a leading edge 1110 of the gate clock signal 312. After the leading edge 1110, the clock signal 312 is masked and next rises at a leading edge 1111. In actuality, although the effective pixel signal 311 once becomes low-level, the clock signal 308 is gated (not output) during the low level of the effective pixel signal 311. Thereby the effective pixel signal 311 received at the leading edge 1110 and the effective pixel signal 311 received at the leading edge 1111 seem continuous on the side of the print-side image processing unit 304. Similarly, during intra-line image data transmission, since the clock signal 308 is gated (not output) during the low level of the effective pixel signal 311, the effective pixel signal 311 can appear continuous in the line.

In addition, during inter-line image data transmission, since the clock signal 308 is output as-is as the gate clock signal 312 without being gated with the effective pixel signal 311, the print-side image processing unit 304 can perform internal processing and inter-line processing according to the clock signal 312 (308).

Figure 12:
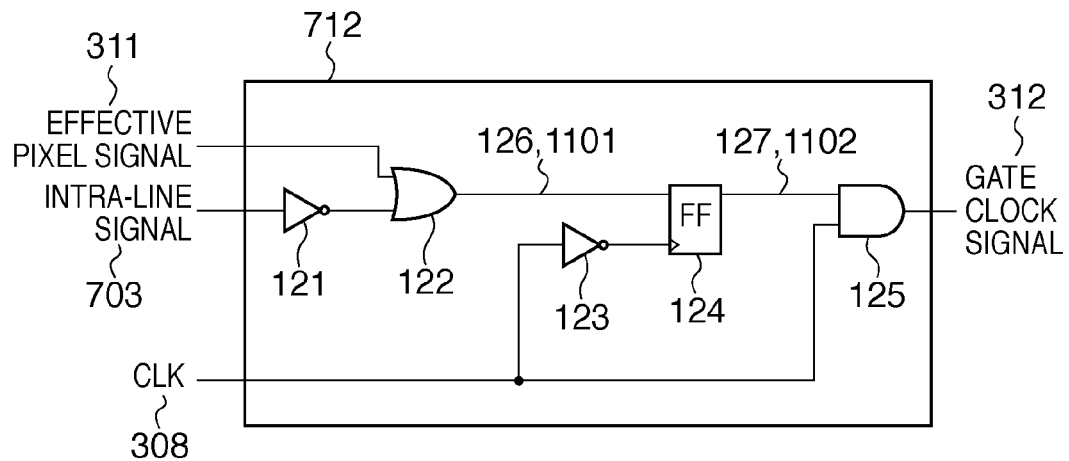
FIG. 12 is a block diagram describing an example of a clock gate circuit according to the first embodiment.

FIG. 12 is a block diagram describing an example of the CLK gate circuit 712 according to the first embodiment, and common parts to those in the aforementioned drawings are denoted by the same reference numerals.

First, a signal 126 (corresponding to the signal 1101 in FIG. 11) is obtained at a logical OR gate 122 by taking a logical OR of a signal obtained by inverting the intra-line signal 703 with an inverter 121 and the effective pixel signal 311. The output of a flip-flop 124 that receives an input of the signal 126 using a clock obtained by inverting the clock signal 308 with an inverter 123 is a signal 127 (corresponding to the signal 1102 in FIG. 11). A logical AND of the signal 127 as a gate signal and the clock signal 308 is taken at a logical AND gate 125. The clock signal thus obtained is the gate clock signal 312 to be supplied to the print-side image processing units 304 and 305.

As described above, the first embodiment enables the supply of image data that is output in synchronization with a discrete effective pixel signal to an image processing unit that receives and processes image data in synchronization with a continuous effective pixel signal, thereby enabling transmission of image data and execution of the processing of the image data.

Additionally, a clock signal is also supplied to the receiver-side image processing unit during inter-line of image data, which eliminates the problem that the image processing unit cannot execute processing during inter-line of image data due to the lack of clocks generated at the back end of each line.

Second Embodiment

Next, a clock gate unit 303a according to a second embodiment of the present invention will be described. Note that a copying machine according to the second embodiment has a similar configuration to that described above in the first embodiment. Following is a description of differences in the configuration of the clock gate unit 303a from that described above in the first embodiment. In the second embodiment, a case is described where print-side image processing units 304 and 305 require five clocks (five cycles) between lines.

First, the configuration of the CLK gate unit 303a according to the second embodiment is described.

Figure 13:
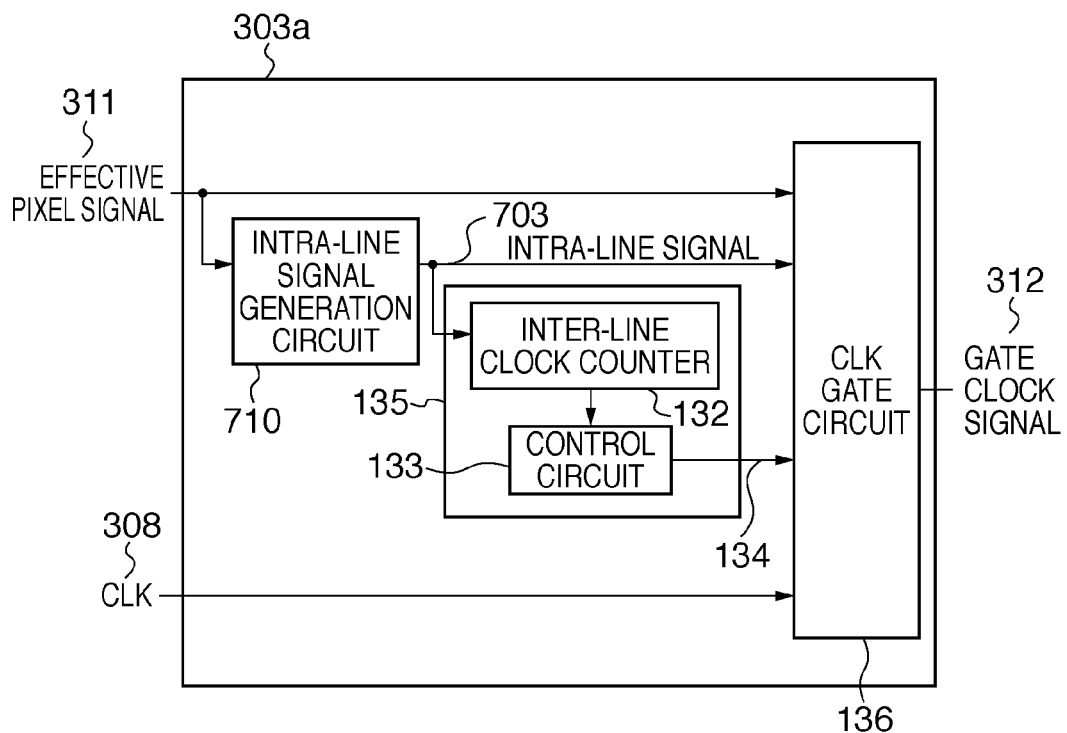
FIG. 13 is a block diagram describing a configuration of a clock gate unit according to a second embodiment.

FIG. 13 is a block diagram describing the configuration of the CLK gate unit 303a according to the second embodiment, and common parts to those in the aforementioned drawings are denoted by the same reference numerals.

An intra-line signal 703 is a signal generated by an intra-line signal generation circuit 710 and indicating "in-line". The intra-line signal generation circuit 710 is identical to that in FIG. 7. An inter-line clock counter 132 is a counter that counts the number of clocks between lines. A control circuit 133 determines whether or not the count value of the inter-line clock counter 132 has reached the number of clocks between lines required by the print-side image processing unit 304 and generates an inter-line gate signal 134. An inter-line gate signal generator 135 includes the inter-line clock counter 132 and the control circuit 133 and generates the inter-line gate signal 134. A CLK gate circuit 136 receives the effective pixel signal 311, the intra-line signal 703, the inter-line gate signal 134, and the clock signal 308 and generates the gate clock signal 312.

Next, an example is described in which, based on the intra-line signal 703 and the effective pixel signal 311, the clock signal 308 is gated during intra-line of image data, whereas the clock signal 308 is output without being gated during inter-line of image data, the number of times that is equal to the number of clock cycles needed.

Figure 14:
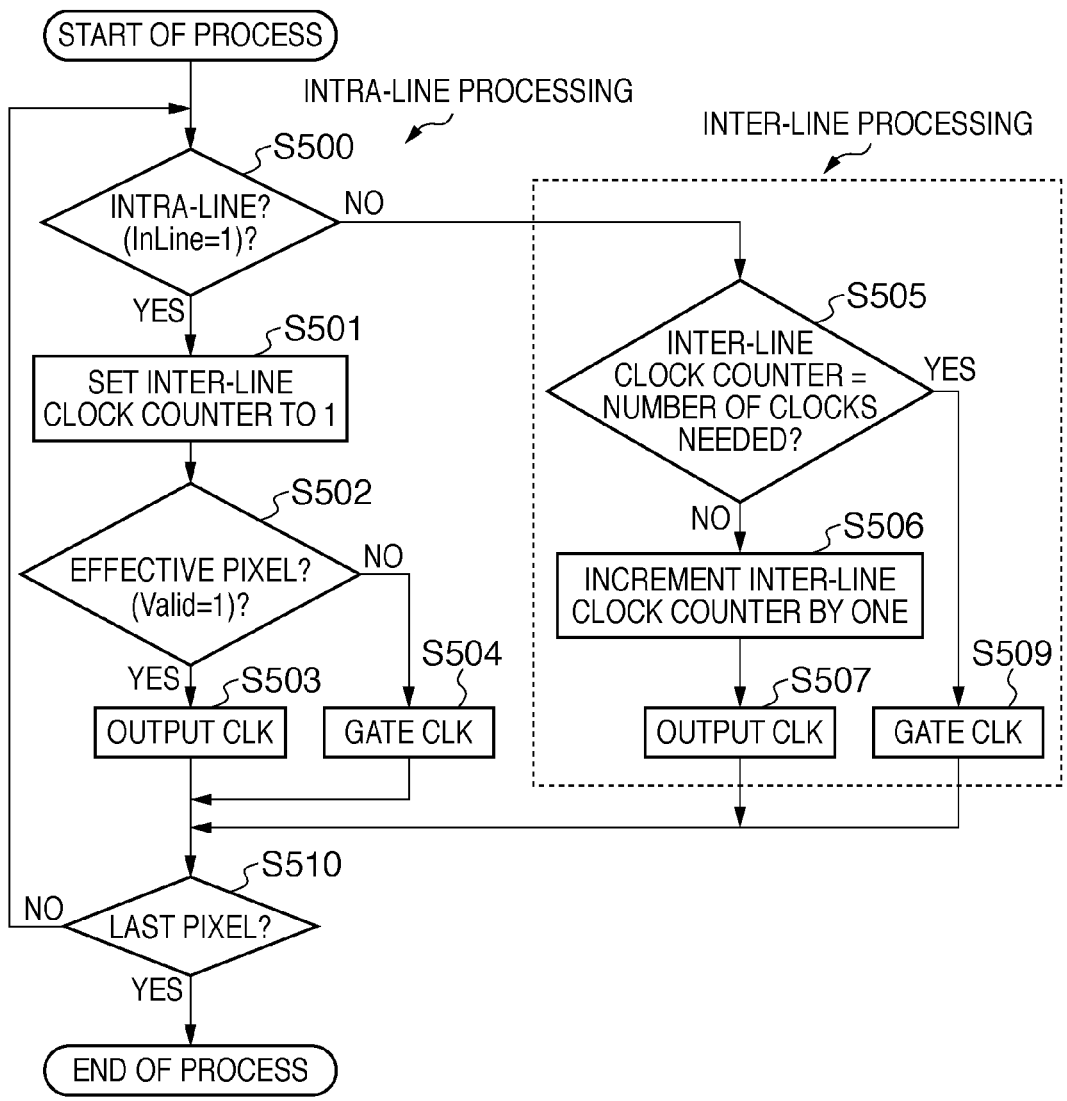
FIG. 14 is a flowchart describing a process for generating a clock for a continuous effective pixel signal according to the second embodiment.

FIG. 14 is a flowchart describing the processing of 5201 in FIG. 8 for generating a clock for a continuous effective pixel signal, according to the second embodiment.

First, it is determined in step S500 whether or not the intra-line signal 703 indicates intra-line image data. If it is determined that intra-line image data is being transmitted, the process proceeds to step S501 where the inter-line clock counter 132 is set to the initial value "1". Next, the process proceeds to step S502 where it is determined whether or not the effective pixel signal 311 has been output. If it is determined in step S502 that the effective pixel signal 311 has been output, the process proceeds to step S503 where a clock pulse of the clock signal 308 is output as the gate clock signal 312 without being gated. On the other hand, if it is determined in step S502 that the effective pixel signal 311 has not been output, the process proceeds to step S504 where the gate clock signal 312 is not output.

On the other hand, if it is determined that intra-line image data is not being transmitted in step S500, the process proceeds to step S505 where inter-line processing is performed. In step S505, it is determined whether or not the count value of the inter-line clock counter 132 has reached the number of clocks needed (in the second embodiment, five clocks). The number of clocks is a set value that has been set in advance in a register (not shown) or the like. If the count value of the inter-line clock counter 132 has not yet reached the number of clocks needed, the process proceeds to step S506 where the inter-line clock counter 132 is incremented by one. The process then proceeds to step S507 where a clock pulse of the gate clock signal 312 is output. On the other hand, if the count value of the inter-line clock counter 132 has reached the number of clocks needed in step S505, the process proceeds to step S509 where the gate clock signal 312 is not output. After the execution of step S503, S504, S507, or step S509, the process proceeds to step S510 where it is determined whether or not the pixel is the last pixel in the line. If the pixel is determined as not being the last pixel, the process returns to step S500 and repeats the aforementioned processing. If the pixel is determined as being the last pixel in step S510, the process ends.

Figure 15:
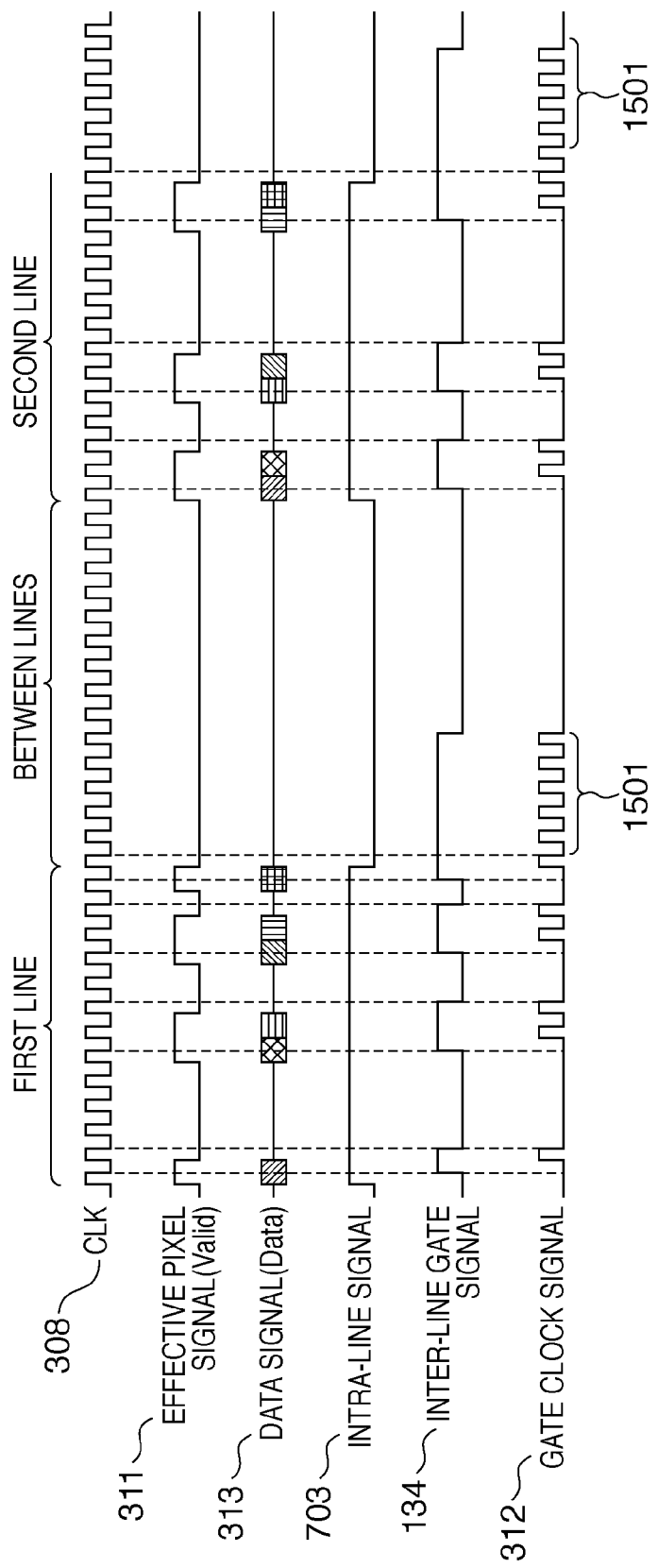
FIG. 15 is a timing chart describing a method for generating a gate clock according to the second embodiment.

Next, a method for generating the gate clock signal according to the second embodiment will be described with reference to the timing chart of FIG. 15.

The clock signal 308 is supplied to the reader-side image processing unit 302 that outputs a discrete effective pixel signal. The effective pixel signal 311 is output from the reader-side image processing unit 302. The image data signal 313 is output from the reader-side image processing unit 302. The inter-line gate signal 134 is a signal that holds the status of the effective pixel signal 311 at every trailing edge of the clock signal 308 when the intra-line signal 703 indicating "in-line" is high-level. During the low level of the intra-line signal 703, which indicates "out-of-line", the inter-line gate signal 134 becomes high-level as many times as the number of clocks needed (in second embodiment, five clocks), as indicated by 1501, and thereafter becomes low-level. Taking a logical AND of the inter-line gate signal 134 thus obtained and the clock signal 308 obtains the gate clock signal 312.

Using the gate clock signal 312 thus obtained as an operation clock, the effective pixel signal 311 and the image data signal 313 are input into the print-side image processing unit 304. This enables the effective pixel signal 311 to seem continuous during intra-line image data transmission. During inter-line of image data, the gate clock signal 312 is output only as many times as the number of clocks needed between lines by the print-side image processing unit 304 (five clocks indicated by 1501 in FIGS. 15) and thereafter the gate clock signal 312 is not output.

This allows the print-side image processing unit 304 to perform both intra-line image data processing and inter-line image data processing.

Figure 16:
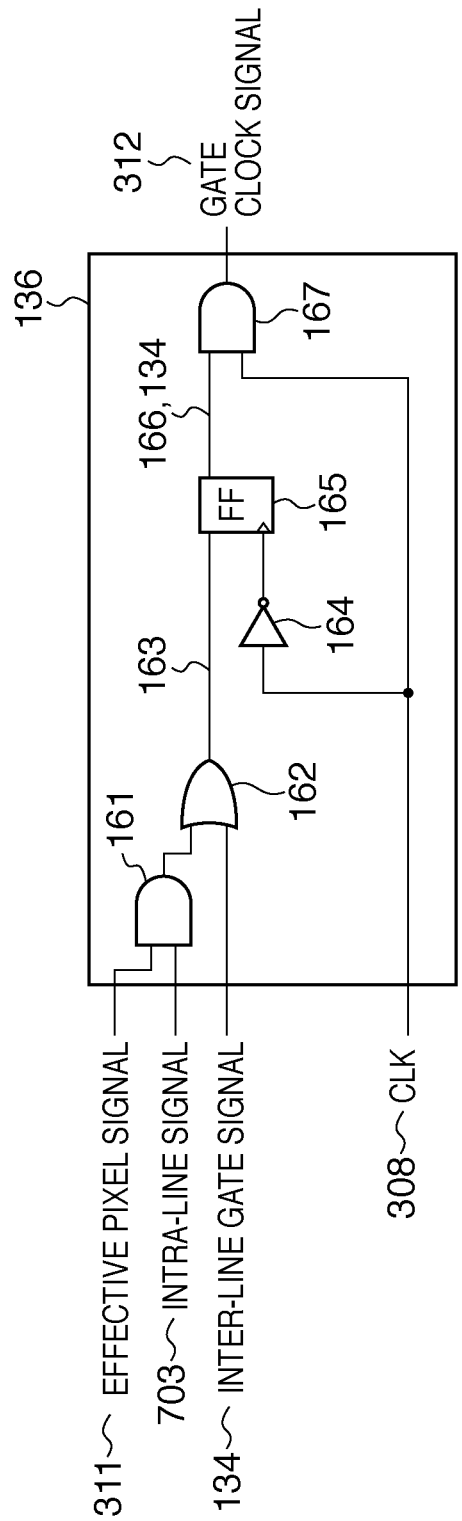
FIG. 16 is a block diagram describing an example of a clock gate circuit according to the second embodiment.

FIG. 16 is a block diagram describing an example of the CLK gate circuit 136 according to the second embodiment. Note that common parts in FIG. 16 to those in the aforementioned drawings are denoted by the same reference numerals.

First, a signal obtained at a logical AND gate 161 by taking a logical AND of the intra-line signal 703 and the effective pixel signal 311, and the inter-line gate signal 134 are input into a logical OR gate 162. The logical OR gate 162 then outputs a signal 163. This signal 163 is a signal obtained by taking a logical OR of the effective pixel signal 311 and the inter-line gate signal 134 in FIG. 15. Then, a flip-flop 165 receives the signal 163 using, as an input clock, a signal obtained by inverting the logic of the clock signal 308 with an inverter 164, and outputs a signal 166 (corresponding to the inter-line gate signal 134 in FIG. 15). This signal 166 is obtained by delaying the signal 163 by the pulse width of the clock signal 308. Then, a logical AND of the signal 166 and the clock signal 308 is taken by a logical AND gate 167 and the result is output as the gate clock signal 312. This gate clock signal 312 is output at the times indicated by the timing chart of FIG. 15.

As described above, the second embodiment has, in addition to the effects of the first embodiment described above, the effect of defining the number of clock signals to be output from the back end of each line and outputting the same number of clocks as defined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-219762, filed Sep. 24, 2009, which is hereby incorporated by reference herein in its entirety.

The invention claimed is:

1. An image processing apparatus including a first image processing that operates at a first clock signal having a first frequency and a second image processing unit that operates at a second clock signal having a second frequency which is higher than the first frequency, the apparatus comprising:
   a control unit that, in a case that image data is supplied from the first image processing unit, to the second image processing unit, performs control so that the second clock signal is supplied to the second image processing unit if intra-line image data of the image data is being transmitted and pixel data to be processed in the image data exists, no clock signal is supplied to the second image processing unit if the intra-line image data of the image data is being transmitted and no pixel data to be processed in the image data exists, and the second clock signal is supplied to the second image processing unit if the intra-line image data of the image data is not being transmitted, irrespective of whether or not the pixel data to be processed in the image data exists.

2. The image processing apparatus according to claim 1, wherein it is determined that the intra-line image data of the image data is being transmitted by the control unit, during a period of time from when the initial pixel data in each line of the image data is input to when the last pixel data in the line is input.

3. The image processing apparatus according to claim 1, wherein it is determined that the intra-line image data of the image data is not being transmitted by the control unit, during a period of time from when the last pixel data in each line of the image data is input to when the initial pixel data in a subsequent line is input.

4. A method for controlling an image processing apparatus including a first image processing unit that operates at a first clock signal having a first frequency and a second image processing unit that operates at a second clock signal having a second frequency which is higher than the first frequency, the method comprising:
   a control step of, when image data is input from the first image processing unit to the second image processing unit, performing control so that the second clock signal is supplied to the second image processing unit if intra-line image data of the image data is being transmitted and where pixel data to be processed in the image data exists, no clock signal is supplied to the second image processing unit if the intra-line image data of the image data is being transmitted and no pixel data to be processed in the image data exists, and the second clock signal is supplied to the second image processing unit if the intra-line image data of the image data is not being transmitted, irrespective of whether or not pixel data to be processed in the image data exists.

5. A non-transitory computer-readable storage medium storing a program for causing an image processing apparatus to perform a control step,
   the image processing apparatus including a first image processing unit that operates at a first clock signal having a first frequency and a second image processing unit that operates at a second clock signal having a second frequency which is higher than the first frequency,
   the control step being a step of, when image data is input from the first image processing unit to the second image processing unit, performing control so that the second clock signal is supplied to the second image processing unit if intra-line image data of the image data is being transmitted and pixel data to be processed in the image data exists, no clock signal is supplied to the second image processing unit if the intra-line image data of the image data is being transmitted and no pixel data to be processed in the image data exists, and the second clock signal is supplied to the second image processing unit if the intra-line image data of the image data is not being transmitted, irrespective of whether or not pixel data to be processed in the image data exists.

* * * * *